US008812871B2

(12) United States Patent
Monclus et al.

(10) Patent No.: US 8,812,871 B2
(45) Date of Patent: Aug. 19, 2014

(54) METHOD AND APPARATUS FOR TRUSTED EXECUTION IN INFRASTRUCTURE AS A SERVICE CLOUD ENVIRONMENTS

(75) Inventors: Pere Monclus, San Jose, CA (US); Fabio R. Maino, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 405 days.

(21) Appl. No.: 12/789,189

(22) Filed: May 27, 2010

(65) Prior Publication Data

US 2011/0296201 A1  Dec. 1, 2011

(51) Int. Cl.
G06F 21/00 (2013.01)
(52) U.S. Cl.
USPC .......................................... 713/190; 713/189
(58) Field of Classification Search
USPC .................................................. 713/189, 190
See application file for complete search history.

(56) References Cited

U.S. PATENT DOCUMENTS

| | | | | |
|---|---|---|---|---|
| 6,101,255 A * | 8/2000 | Harrison et al. | ................ | 380/52 |
| 6,895,506 B1 * | 5/2005 | Abu-Husein | .................. | 713/193 |
| 6,983,374 B2 * | 1/2006 | Hashimoto et al. | ........... | 713/194 |
| 7,272,832 B2 * | 9/2007 | Gardner | ........................ | 718/105 |
| 7,353,404 B2 * | 4/2008 | Hashimoto et al. | ........... | 713/194 |
| 7,568,112 B2 * | 7/2009 | Yamaguchi et al. | .......... | 713/190 |
| 7,865,733 B2 * | 1/2011 | Goto et al. | .................... | 713/176 |
| 8,001,374 B2 * | 8/2011 | Wise | ............................. | 713/164 |
| 8,108,641 B2 * | 1/2012 | Goss et al. | .................... | 711/163 |
| 8,577,031 B2 * | 11/2013 | Asperger et al. | ................ | 380/46 |
| 2002/0184046 A1 * | 12/2002 | Kamada et al. | .................... | 705/1 |
| 2003/0033537 A1 * | 2/2003 | Fujimoto et al. | .............. | 713/193 |
| 2004/0255199 A1 * | 12/2004 | Yamashita | ....................... | 714/37 |
| 2005/0138370 A1 | 6/2005 | Goud et al. | | |
| 2010/0011210 A1 | 1/2010 | Scarlata | | |
| 2010/0042824 A1 * | 2/2010 | Lee et al. | .......................... | 713/2 |
| 2010/0088205 A1 | 4/2010 | Robertson | | |
| 2010/0281273 A1 * | 11/2010 | Lee et al. | ....................... | 713/190 |
| 2010/0299537 A1 * | 11/2010 | Mackey et al. | ............... | 713/190 |

OTHER PUBLICATIONS

When Virtual is Harder than Real: Security Challenges in Virtual Machine Based Computing Environments; Tal Garfinkel et al.; Proceedings on the 10th Workshop on Hot Topics in Operating Systems; Jun. 2005.*
Virtualization Security; Eugene Shultz et al.; Conference'04, Month 1-2, 2004; ACM.*
The International Search Report and Written Opinion of PCT/US2011/037799 dated Jan. 19, 2012.

* cited by examiner

*Primary Examiner* — Bradley Holder
*Assistant Examiner* — James Turchen
(74) *Attorney, Agent, or Firm* — Patterson & Sheridan LLP

(57) ABSTRACT

The present disclosure presents a method and apparatus configured to provide for the trusted execution of virtual machines (VMs) on a virtualization server, e.g., for executing VMs on a virtualization server provided within Infrastructure as a Service (IaaS) cloud environment. A physical multi-core CPU may be configured with a hardware trust anchor. The trust anchor itself may be configured to manage session keys used to encrypt/decrypt instructions and data when a VM (or hypervisor) is executed on one of the CPU cores. When a context switch occurs due to an exception, the trust anchor swaps the session key used to encrypt/decrypt the contents of memory and cache allocated to a VM (or hypervisor).

9 Claims, 6 Drawing Sheets

METHOD AND APPARATUS FOR TRUSTED EXECUTION IN INFRASTRUCTURE AS A SERVICE CLOUD ENVIRONMENTS

TECHNICAL FIELD

Embodiments presented in this disclosure generally relate to techniques for providing a computing infrastructure for a virtualization server, and more particularly, to a method and apparatus for trusted virtual machine execution in an Infrastructure as a Service (IaaS) cloud environment.

BACKGROUND

Server virtualization technology allows multiple virtual machines to run concurrently on a single physical computing system. Currently, data center environments are used to create large clusters of such physical computing systems (commonly referred to as servers), where each server runs multiple virtual machines (VMs). This approach has led to data centers that can supply massive amounts of computing power. Several providers currently allow users to supply virtual machine instances to run on the virtualization servers provided by the operator of the data center. In various forms, this general model of computing has come to be referred to as "cloud computing" or "Infrastructure as a Service" (IaaS) because users simply run their virtual machine instances on an abstract hardware platform, without having to own or manage that hardware platform. This approach allows a given user to rapidly scale up dozens, if not hundreds or thousands of virtual machine instances to respond to changes in demand for computing resources.

At the same time, a significant obstacle faced by of cloud computing and IaaS providers is the need for users to trust the cloud provider and the implementation of the hypervisor (or Virtual Machine Manager, (VMM)) that manages multiple VMs running on a server. Currently this is done by audits and understanding of the operating processes that cloud providers have in place in regards to security. This leads to a sense of trust, but there is not a strong mechanism to guarantee effective separation between VMs executed in the same central processing unit (CPU) server socket.

The fact that VMs belonging to different enterprises are collocated in the same server can lead to side attacks and security concerns. For example, when VMs belonging to different enterprises are executed in distinct cores of the same CPU, they share access to memory via an L3 cache (or bypassing memory protections set by the hypervisor). In the hands of skilled individuals, this could lead to information being leaked from one VM to the other. That is, a malicious VM from one enterprise could try to gain access the memory of a VM running on behalf of another enterprise.

Another concern is the hypervisor itself. Even if the hypervisor is designed to enforce separation between distinct VMs, data could still leak from one VM to the other, either for a hypervisor bug or for explicit attacks directed against the hypervisor itself. Further, another set of attacks could be launched by a malicious administrator who is part of the cloud provider personnel.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Figure 1B:
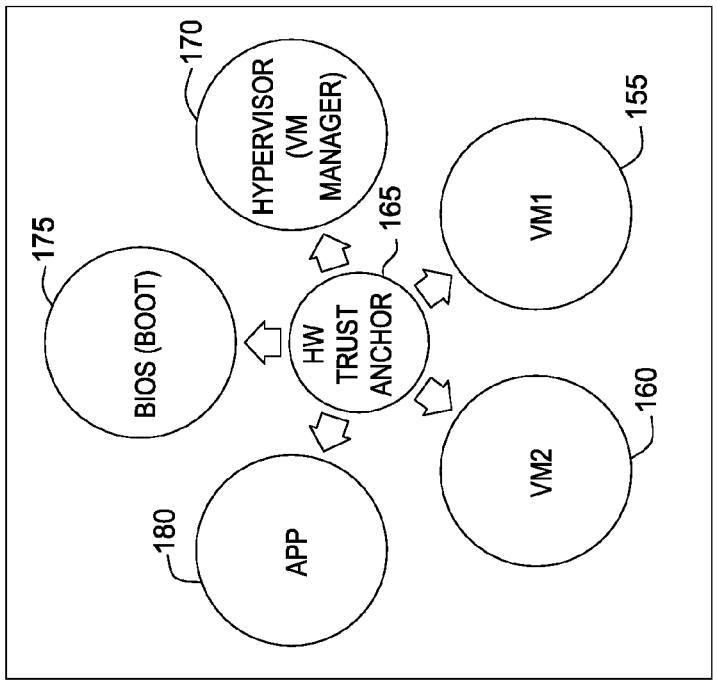
FIGS. 1A-1B are block diagrams illustrating different security models for trusted execution in Infrastructure as a Service (IaaS) cloud environments, according to certain embodiments of the present disclosure.

One embodiment described herein includes a method for performing a context switch on a processing core of a CPU. The method may generally include receiving an indication of an incoming execution context for the processing core and storing a first session key. The first session key is associated with a current execution context of the processing core. The method may also include retrieving a second session key, where the second session key is associated with the incoming execution context. The method may also include initializing an encrypt/decrypt block on the CPU using the second session key. The encrypt/decrypt block is disposed between the processing core and a cache accessed by the processing core.

In a particular embodiment, the method may further include the incoming execution context on the processing core. In such a case, the encrypt/decrypt block decrypts data read from the cache and encrypts data written to the cache using the second session key. The encrypt/decrypt block itself may provide a hardware implementation of a stream cipher, and wherein a key stream is generated for a read from the cache using the second session key, a nonce value, and a memory address associated with a read or write operation.

Another embodiment of the disclosure includes a system having a memory and a central processing unit (CPU). The CPU may generally include a processing core, a cache and a trust anchor. The trust anchor may be generally configured to receive an indication of an incoming execution context for the processing core, store a first session key, where the first session key is associated with a current execution context of the processing core. The trust anchor may be further configured to retrieve a second session key, wherein the second session key is associated with the incoming execution context and initialize an encrypt/decrypt block on the CPU using the second session key, wherein the encrypt/decrypt block is disposed between the processing core and a cache accessed by the processing core.

Still another embodiment includes a method for executing a plurality of virtual machine instances on a multi-core CPU. This method may generally include determining an exception has occurred while executing a first virtual machine instance on a first processing core of a multi-core CPU, signaling a trust anchor coupled to the CPU with an indication of an incoming execution context for the first processing core, and storing a first session key. The first session key is associated the first virtual machine executed on the processing core. This method may also include retrieving a second session key, where the second session key is associated with the incoming execution context and initializing an encrypt/decrypt block on the CPU using the second session key, wherein the encrypt/decrypt block is disposed between the first processing core and a cache shared by each processing core on the multi-core CPU.

Description of Example Embodiments

Embodiments described herein present a method and apparatus configured to provide for the trusted execution of virtual machines VMs on a virtualization server, e.g., for executing VMs on a virtualization server provided within Infrastructure as a Service (IaaS) cloud environment. One embodiment described herein provides a model for memory compartmentalization between VM instances executed on the VM server. The model may allow VMs to be executed in an un-trusted cloud provider infrastructure in a trusted manner. In particular, the memory compartmentalization techniques described herein allow a virtualization server to boot an encrypted/signed VM image as well as prevent other entities running on that virtualization server from accessing a given VM's memory, even in cases where an entity is executing running with higher execution privileges (e.g., the hypervisor).

Further, embodiments described herein provide an infrastructure that may be used to provision the appropriate credentials (i.e., an encryption key) to enable trusted execution of VMs on a CPU core. Doing so may protect the memory from being leaked (maliciously or otherwise) to VMs running on other cores in cases where the VMs share accesses to a common L3 cache.

As described in greater detail herein, a physical multi-core CPU may include a hardware trust anchor component. The trust anchor may be configured to manage keys used to encrypt/decrypt instructions and data when a VM or hypervisor is executed on a core of the multi-core CPU. In one embodiment, the trust anchor may receive a key associated with an encrypted VM boot image using a secure communications process. Once received and stored by the trust anchor, the key may be used to decrypt the VM boot image and load it into memory on the virtualization server. When the hypervisor performs a context switch to execute the resulting VM instance, the trust anchor provides a session key (along with other data) used to encrypt/decrypt memory read and write operations.

In one embodiment, an encrypt/decrypt block on each cache line between a shared L3 cache and an L2 cache local to each processing core may operate in an Advanced Encryption Standard (AES) Counter Mode (AES-CTR) using the session key supplied by the trust anchor, a memory address, and a nonce to encrypt data written into the L3 cache. The same information (e.g., the key, nonce and memory address) is used to decrypt data when read from the L3 cache (or from memory).

When an exception occurs (e.g., a timer interrupt, a hardware access, etc.) the trust anchor swaps out the key associated with the running VM instance and selects the appropriate key for a new execution context. In one embodiment, the CPU may be configured to signal the trust anchor with an execution context for the next VM instance (or hypervisor) scheduled for execution. For example, the virtualization extensions provided by the Intel® VT-x technology and AMD-V technology. Further, the process for switching keys and initializing an encryption engine included in the trust anchor may require fewer clock cycles than required for the context switch itself.

The following description is presented to enable one of ordinary skill in the art to make and use the proposed techniques. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purpose of clarity, features relating to technical material that is known in the technical fields related to the proposed ideas have not been described in detail.

Figure 1A:
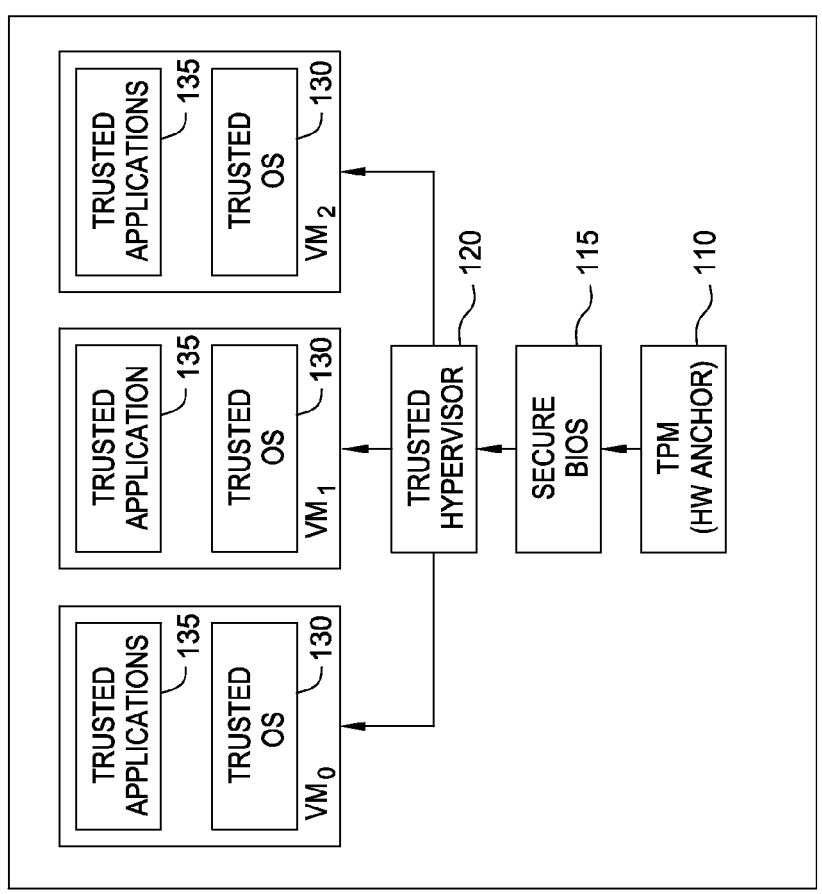

FIGS. 1A-1B are block diagrams illustrating different models for trusted VM execution in Infrastructure as a Service (IaaS) cloud environments, according to certain embodiments of the present disclosure. As shown in FIG. 1A, a stack model 105 may be used to provide a trusted environment for executing one or more virtual machines 125. In particular, a hardware anchor chip (e.g., a Trusted Platform Module (TPM) 110), or equivalent, may be used to perform the following tasks: secure key storage, signature imposition/verification, and secure export of keys, etc. The TPM 110 forms the fist link of trust in the stack model 105. Once the TPM 110 validates it, the secure BIOS 115 may in turn validate that the hypervisor 120 has not been modified. Doing so extends the trust chain from the TPM 110 to the secure BIOS 115, and subsequently, to the hypervisor 120. Once booted, the hypervisor 120 follows the same procedure to bring up the virtual machine 125. That is, once validated by the secure BIOS 115, the hypervisor 120 acts as a trusted actor to validate and boot a virtual machine instance 125. Thereafter, the operating system 130 on each virtual machine 125 do the same to boot applications 135. More simply, TPM 110 validates the BIOS 115, which validates the hypervisor 120, which in turn validates each VM 125 booted on the hypervisor 120. Thus, the stack model 105 relies on each element in the chain trusting its predecessor.

In stack model 105, the upper layers rely on the lower layers for trust. If there is any breakage on the chain, the system is not secure. Further, the lower layers on the chain may still have visibility to what upper layers may be executing. Further still, even when a hypervisor validates and boots a given virtual machine 125, it does not limit the actions performed by trusted OS 130 and trusted applications 135. Thus, the stack model 105 does not prevent an otherwise validated application 135 (or VM 125) from accessing data belonging to another VM executed by the hypervisor 120, e.g., data stored in a L3 cache.

Figure 2:
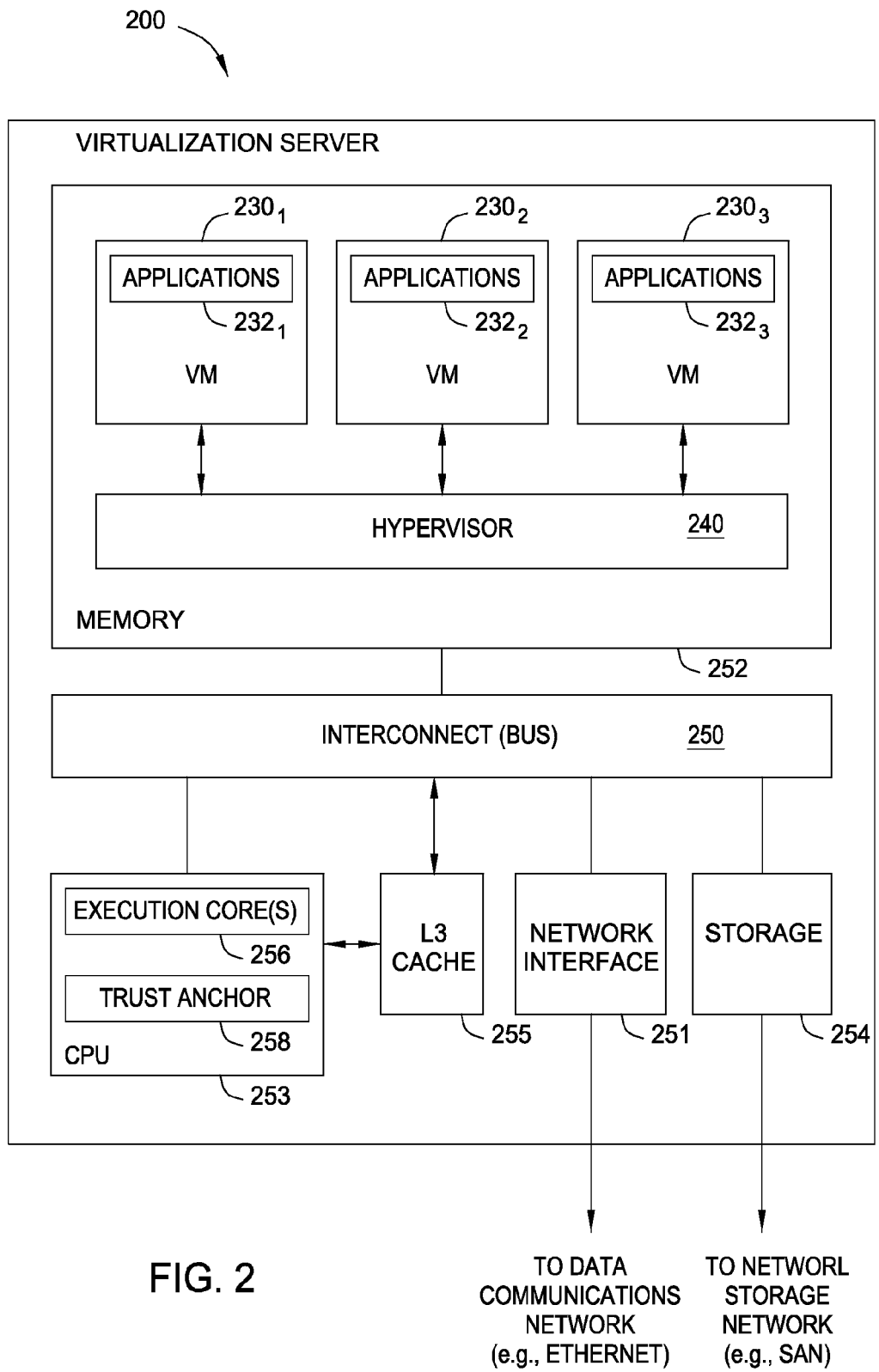
FIG. 2 is a block diagram illustrating components of a virtualization server configured to provide for the trusted execution of multiple VMs in an IaaS environment, according to certain embodiments of the present disclosure.
Figure 3:
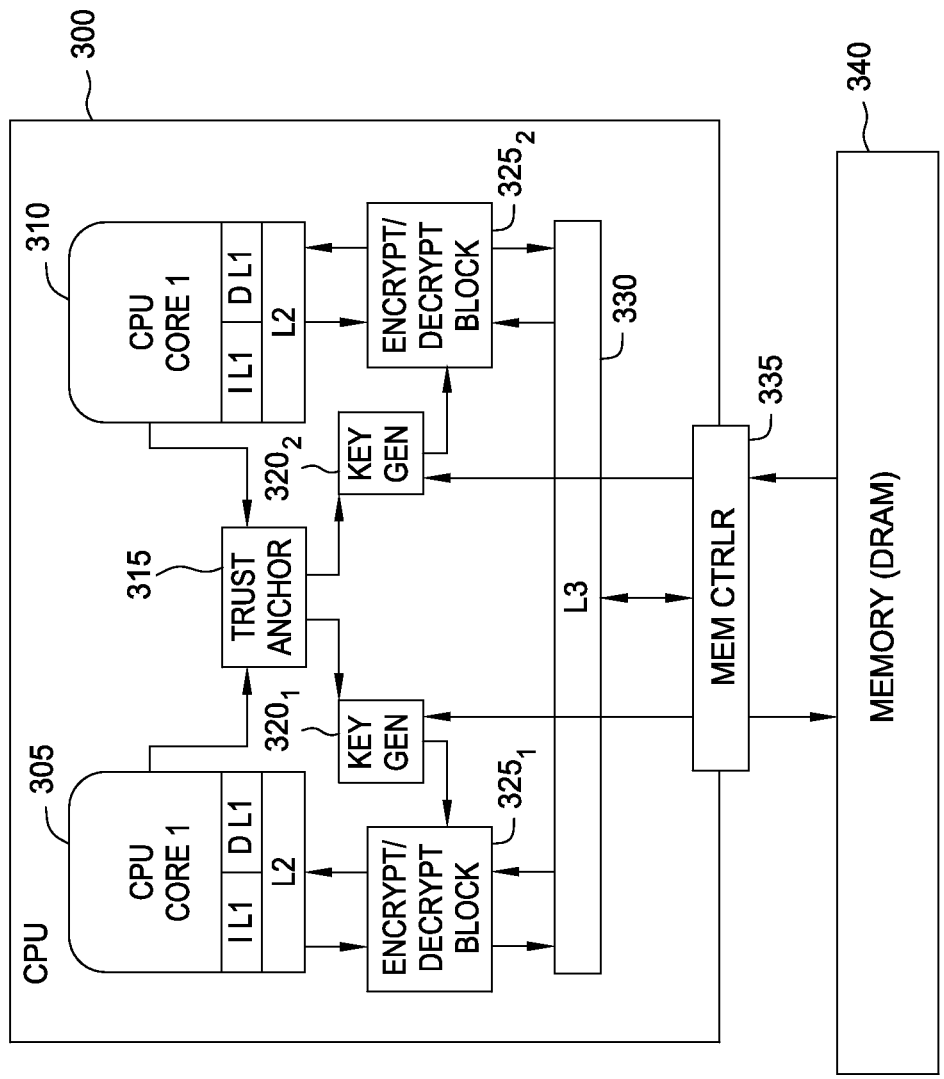
FIG. 3 is a block diagram illustrating an example of a processor architecture configured to provide for trusted virtual machine execution in an IaaS environment, according to certain embodiments of the present disclosure.
Figure 4:
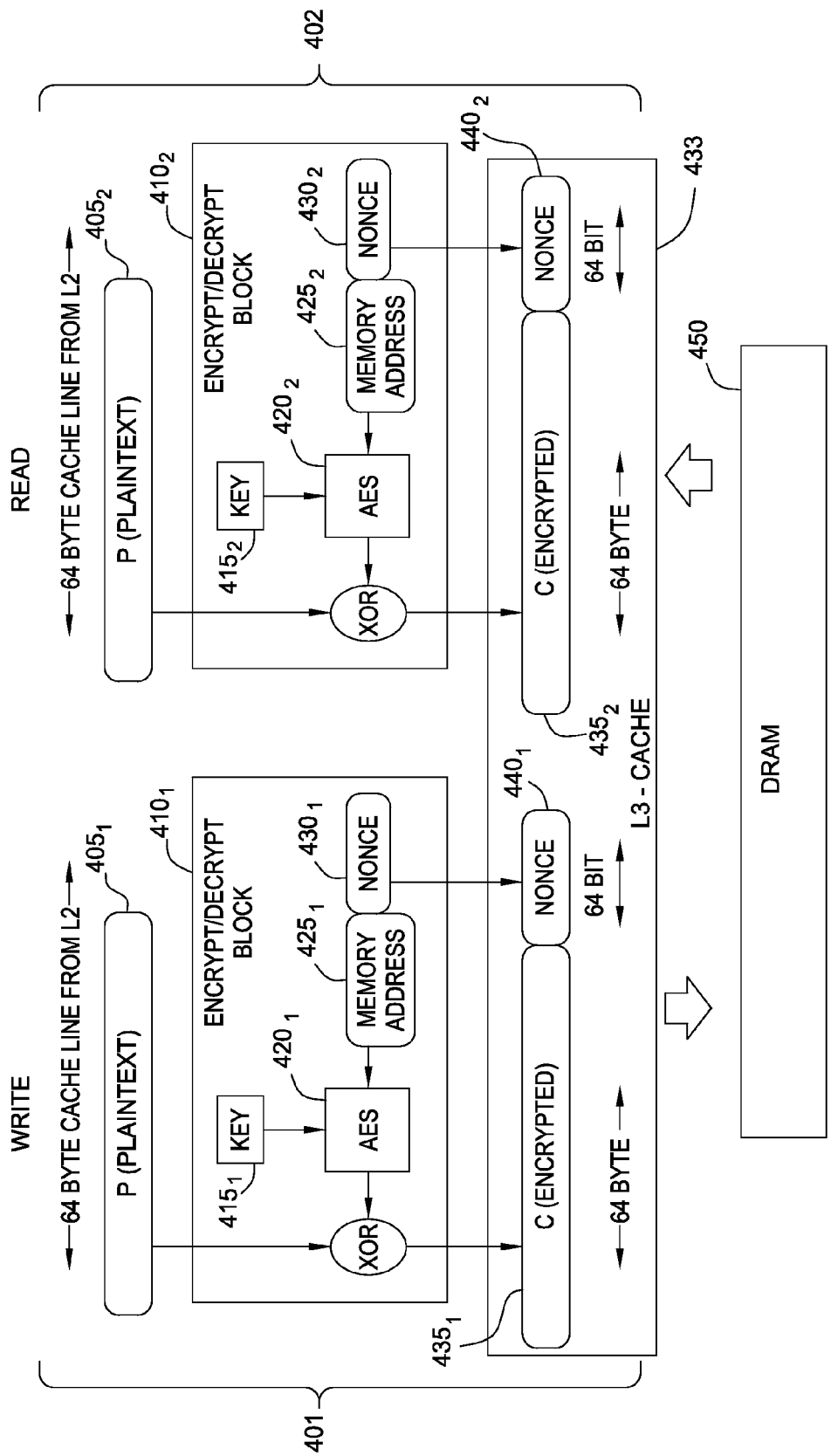
FIG. 4 further illustrates aspects of the CPU architecture first shown in FIG. 3, according to certain embodiments of the present disclosure.

FIG. 1B shows an alternative trust model, according to one embodiment presented in this disclosure. As shown, the trust model 150 provides a star model where the trust anchor 165 sits in the middle rather than at the bottom. Doing so allows the trust anchor 165 to directly validate a BIOS 175 and a hypervisor 170 on a virtualization server. But further, doing so also allows the trust anchor 165 to validate each VM image passed to the hypervisor 170 for execution (e.g., VM1 155 and VM2, 160) as well as to validate code for applications 108 to load and execute on the VMs 155,160. That is, unlike the stack model 105, the star model 150 provides a trust anchor 165 configured to provides a trust anchor 165. In order to prevent unauthorized access between execution contexts, the star model 150 shifts from integrity protection (in the stack model) to confidentiality for each relevant actor within a virtualization server. Doing so may be used to provide a secure computing environment for VMS 155, 160. For example, unlike the stack model 105, the star model 150 prevents actors with higher privileges (e.g., hypervisor 170) from accessing the data of other actors (e.g., VMs 155,160) as wells as prevents one VM from accessing data belonging to another VM, even when such VMs are executed concurrently in different cores on a multi-core processor and sharing an L3 cache and memory. FIGS. 2-4, discussed below, provide an example architecture implementing the star model 150 shown in FIG. 1B on a virtualization server with a multi-core CPU.

FIG. 2 is a block diagram illustrating components of a virtualization server 200 configured to provide for the trusted execution of multiple VMs in an IaaS environment, according to certain embodiments of the present disclosure. The virtualization server 200 may generally include a collection of hardware computing components connected by one or more interconnects 250. Illustratively, virtualization server 200 includes network interface cards (NICs) 251, a memory 252, CPU(s) 253, and a storage device 254 (e.g., a locally attached disk drive, solid-state device (SSD), or a connection to remote storage such as a SAN).

Virtualization server 200 allows multiple virtual machines (VMs) $230_{1-3}$ to execute on the server 200 concurrently, sharing the computing hardware present on the virtualization server 200. However, the virtual machines $230_{1-3}$ are not generally aware of the computing hardware on the virtualization server 200 directly. Instead, a hypervisor 240 may be configured to provide virtualized hardware elements for each virtual machine $230_{1-3}$. Note, while the virtual hardware allocations appear distinct to the OS and applications 136 running on each virtual machine $230_{1-3}$, they are shared below the virtualization layer. That is, the virtual resources provide an abstraction for the underlying physical resources—and the underlying physical resources are shared among the virtual machines $230_{1-3}$.

Illustratively, the memory 252 includes the hypervisor 240 managing three virtual machine instances (VMs) $230_{1-3}$. Each VM $230_{1-3}$ provides a virtualized computing platform with a virtual CPU, memory, storage, and networking interfaces. An operating system is booted on each VM $230_{1-3}$ and used to load and execute applications $232_{1-3}$. In one embodiment, the hypervisor 240 may be implemented as a software layer that runs directly on the computing hardware of the virtualization server 200. In such a case, the hypervisor 240 may be configured to intercept some (or all) operating system calls made by the OS running on a VM 230.

More generally, the hypervisor 240 runs over the system hardware and allows the virtualization server 200 to host the VMs $230_{1-3}$. In one embodiment, a trust anchor 258 may be used to validate the hypervisor 240. That is, the hypervisor 240 (i.e., the image of the hypervisor 240 on a storage disk) 240 may be signed by an encryption key, and the trust anchor 258 may be configured to obtain the key needed to verify that the hypervisor 240 has not been modified, prior to loading the hypervisor 240. For example, a given IaaS provider (or hypervisor vendor) may sign the hypervisor code using a private key of a private/public key pair. In some cases, the public key may also be signed by a certificate authority (and provided as part of a PKI certificate). In turn, the trust anchor 258 may obtain the public key from the PKI certificate and validate the digital signature associated with the hypervisor 240.

Once validated, the hypervisor 240 may boot and execute VMs $230_{1-3}$. Further, each VM 230 may also be a signed and/or encrypted object. For example, an enterprise may transmit a VM image encrypted using a VM encryption session key to the virtualization server 200. In one embodiment, the trust anchor 258 authenticates itself to the enterprise in order to obtain the VM image encryption key associated with a given VM 230 prior to executing that VM 230 on the virtualization server 230. The VM image encryption key may be used to decrypt an encrypted VM image submitted to the virtualization server 200.

Further, the trust anchor 258 may generate (or obtain) a memory session key for each given VM 230 and use it to encrypt/decrypt information read from and written to the cache 255 while a VM executes on one of the execution cores 256. The trust anchor 258 may be configured to swap memory session keys whenever the execution context on one of the execution cores 256 on CPU 253 is changed, e.g., a context-switch between different VMs $230_{1-3}$ or between a VM $230_{1-3}$ and the hypervisor 240 itself.

The cache 255 provides a high-speed memory accessed by the execution cores 256 on the CPU 253. While memory 252 can be segmented across virtual machines 230, cache 255 is often shared by different VMs $230_{1-3}$. For example, as shown, CPU 253 may include one or more execution cores 256. When distinct VMs $230_{1-3}$ are executed on different execution cores 256, the VMs $230_{1-3}$ may share access to the cache 255. In one embodiment, the trust anchor 258 may use a distinct memory session key for each VM 230 to encrypt/decrypt each read/write to the cache 255. Doing so prevents a VM 230 executing on one execution core 256 from accessing data in the cache 255 belonging to another VM 230 executing on a different execution core 256. Further, doing so also prevents the hypervisor 240 from accessing data in the cache 255 belonging to a given VM $230_{1-3}$, despite the hypervisor 240 having a generally higher privilege level.

FIG. 3 is a block diagram illustrating an example of a processor architecture configured to provide for the trusted virtual machine execution in an IaaS environment, according to certain embodiments of the present disclosure. As shown, a CPU 300 includes two distinct processing cores 305, 310. And each CPU core 305 includes a layer 1 (L1) instruction and data cache and an L2 cache. CPU 300 also includes a trust anchor 315, and processing cores 305, 310 each have an associated key generation component $320_{1-2}$ and an encrypt/decrypt block $325_{1-2}$. Illustratively, cache lines connecting processing cores 305, 310 to a shared L3 cache 330 each include one of the encrypt/decrypt blocks $325_{1-2}$. The L3 cache 330 is connected to a memory controller 335, which in turn is connected to a memory 340.

Although CPU 300 illustrates an example embodiment with two processing cores 305, 310, one of ordinary skill in the art will recognize that the embodiments described herein can readily be adapted for a CPU having more processing cores. In such a case, each additional CPU core would include a connection to the trust anchor 315 as well as a key generation component 320 an encrypt/decrypt block connected the shared L3 cache 330.

In one embodiment, the trust anchor 315 may be configured to manage multi-tenancy execution context (i.e., the execution of multiple virtual machine images) on the processing cores 305, 310 as well as manage communications with the external world. For example, the trust anchor 315 may be configured to provide a secure boot process for loading and booting a VM instance, to provide for secure context switching between VM instances, to swap memory session keys based on execution context, and to provide for secure key storage during VM execution. Further, the trust anchor 315 embedded with the CPU 300 may be provisioned, at manufacturing time, with a public/private key pair and a certificate issued by a certificate authority (CA) that binds the trust anchor identity to the public key. The CPU model and manufacturer name may be included as attributes of this certificate. In one embodiment, the trust anchor 315 may use the public/private key pair to prove that a virtualization server has a multi-core CPU configured with a trust anchor and, accordingly, can boot and execute a VM image in an otherwise untrusted cloud environment.

Additionally, the trust anchor 315 may receive an indication from a processing core 305, 310 whenever a context switch occurs. Such an indication may provide an identifier for an incoming execution context. As noted above, certain multi-core processors provide an extended instruction set that allow for an execution context to be exported from a processing core on a CPU. For example, the virtualization extensions provided by the Intel® VT-x technology and the VMX instruction set provide instructions used to signal changes in execution context on a processing core (e.g., the VMEXIT and VMRESUME instructions).

In response to a signal from one of the cores 305, 310 indicating a change in execution context, the trust anchor 315 may configure the encrypt/decrypt block $325_{1-2}$ and key generation component $310_{1-2}$ associated with that processing core 305, 310 for the new execution context. When a context switch occurs, the trust anchor swaps out a key associated with the then current execution context on a processing core 305, 310 and replaces it with a key associated with the incoming execution context. As is known, a context switch on a multi-core processor between VM instances (or between a VM instance and the hypervisor) requires registers (e.g., status, IR, general purpose, counters) on the CPU core to be restored (or initialized) for the incoming execution context. In one embodiment, the trust anchor 315 may be configured to swap the appropriate encryption key and initialize the encrypt/decrypt block $325_{1-2}$ using fewer clock cycles than required to perform the context switch itself (currently, a process that typically requires ~20-30 clock cycles). Doing so allows the trust anchor to provide a secure execution context for the incoming VM instance (or hypervisor) without introducing any collateral latency.

Once initialized, the encrypt/decrypt block 325 encrypts/decrypts data as it is moved over cache lines between the processing core 305, 310 and the L3 cache 255. In one embodiment, the encrypt/decrypt blocks $325_{1-2}$ provide a hardware based implementation of a stream cipher. As is known, stream cipher is a symmetric key cipher where plaintext is combined with a keystream to encrypt small units of data (e.g., a single bit or byte at a time). In a particular embodiment, the encrypt/decrypt blocks may be configured to use AES-CTR (Advanced Encrypted Standard-Counter mode) as the stream cipher. Using a stream cipher allows data to be encrypted/decrypted as it moves between a processing core 305, 310 and the L3 cache 330 without requiring additional clock cycles. Instead, once initialized, the encrypt/block block $325_{1-2}$ may simply XOR each bit being moved to/from the particular core 305, 310 using the keystream. Thus, the functionality provided by the trust anchor is located adjacent to each processing core 305, 310 and secures any element shared by VMs running on different cores (in this case L3 cache 330 and memory 340). In one embodiment, the key generation components $320_{1-2}$ may be configured to use a VM key, a memory address and a nonce to generate a keystream used by the encryption/decryption blocks $325_{1-2}$.

The memory controller 335 may be configured to move data between memory 340 and the L3 cache. For example, the memory controller 335 may select to flush data from the L3 cache 330 to the memory 340. In one embodiment, when doing so, the memory controller 335 also writes the nonce value used to encrypt the data when it was written to the L3 cache 330 to memory 340. Similarly, the memory controller 335 may retrieve the appropriate nonce value when reading encrypted data from the memory 340.

FIG. 4 further illustrates aspects of the processor architecture first shown in FIG. 3, according to certain embodiments of the present disclosure. In particular, FIG. 4 shows the processor architecture of FIG. 3 used to perform a secure write operation 401 to an L3 cache 433 and used to perform a secure read operation 402 from the L3 cache 433.

As shown, the write operation 401 encrypts plaintext data $405_1$ as it is moved from an L2 cache local to a processing core to an L3 cache 433 shared by multiple processing cores. Illustratively, an encrypt/decrypt block $410_1$ includes a key $415_1$, an AES engine $420_1$, a memory address $425_1$ and a nonce $430_1$. The key $415_1$ is provided to the encrypt/decrypt block $410_1$ by the trust anchor. As noted above, the key $415_1$ corresponds to a VM (or hypervisor) being executed on one of the processing cores of a multi-core CPU (e.g., the processor architecture shown in FIG. 3). The memory address $425_1$ corresponds to a memory address of the plaintext $405_1$ being written from an L2 cache to the shared L3 cache 433. The nonce $430_1$ provides a one-time value used for a given write operation. Typically, the nonce $430_1$ may be a counter value incremented for each write (and read) to the shared L3 cache 433. Alternatively, however, the nonce $430_1$ may be generated from a random or pseudo-random noise source.

In one embodiment, the AES engine 420 provides a hardware implementation of the AES-CTR stream cipher and is configured to generate a keystream from the key material, i.e., from the key $415_1$, the memory address $425_1$, and the nonce $430_1$. The resulting keystream is XORed with the plaintext $405_1$ as it is pushed from the L2 cache on a processing core to the shared L3 cache 433, resulting in ciphertext $435_1$. In addition to writing the resulting encrypted data to the L3 cache 433, the nonce value in the encrypt/decrypt block $410_1$ is also written to the L3 cache 433 (shown in FIG. 4 as nonce $440_1$). In one embodiment, the encrypt/decrypt block $410_1$ may include a separate cache line to the L3 cache 433 allowing the nonce $430_1$ to be stored in the L3 cache 433 (as nonce $440_1$) in parallel with the plaintext $405_1$ being enciphered using the keystream and stored in the L3 cache 433 as ciphertext $435_1$. Alternatively, the nonce $340_1$ may written to the cache 433 using the same cache line used to write the ciphertext $435_1$.

The read operation 402 is similar to the write operation 401, but in the reverse direction. To read enciphered data $435_2$ from the L3 cache 433, the memory address $425_2$ and the nonce $440_2$ are read into the encrypt/decrypt block $410_2$. Again, the key $415_2$ is the session key associated with a VM (or hypervisor) being executed on a processing core of a multi-core processor—and remains unchanged between context switches on the processing core. The memory address $425_2$ corresponds to the memory address of the data being pulled into the L2 cache and the nonce $430_2$ is the nonce value used to encipher the data when it was written to the L3 cache 433. That is, the same key material used by the write operation 401 to generate a keystream used to encrypt the plaintext $405_1$ is used to re-generate the same keystream to decrypt the encrypted data $435_2$ from the L3 cache 433. The resulting keystream is then XORed with the encrypted data $435_2$ from the L3 cache 433 and written as plaintext $405_2$ in the L2 cache.

Figure 5:
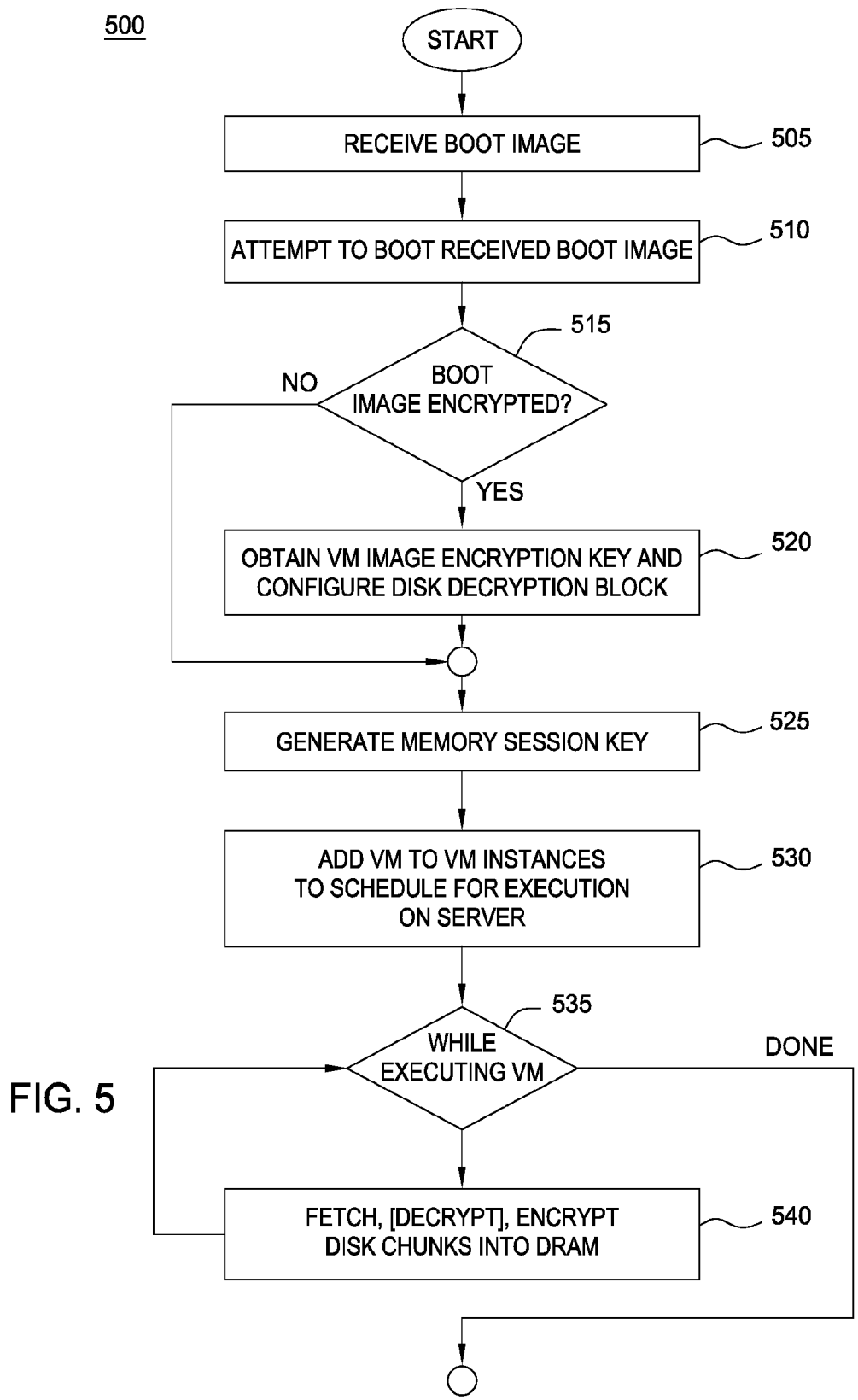
FIG. 5 illustrates a method for securely booting a VM instance, according to certain embodiments of the present disclosure.

FIG. 5 illustrates a method 500 for securely booting a VM instance, according to certain embodiments of the present disclosure. As shown, the method 500 begins at step 505 where a hypervisor receives a boot image of a virtual machine to boot and execute on a virtualization server. For example, in one embodiment, a user may transmit a VM boot image to a cloud provider along with a set of requirements for the virtualized hardware system on which to execute the VM instance (e.g., a processor speed, memory requirements, etc.). The VM boot image may be encrypted using a VM image encryption key generated by the user. In one embodiment, each 4 kb chunk is encrypted independently so that chunks may be decrypted and paged in and out of memory on the virtualization server without decrypting the whole image At step 510, the hypervisor attempts to boot the VM boot image. At step 515, the hypervisor determines whether the VM boot image is encrypted. If so, the hypervisor triggers a negotiation between the trust anchor and the user that submitted the VM boot image for execution (or an associated key service) to obtain the VM image encryption key used to encrypt the VM boot image. Once obtained, the trust anchor configures a disk control block with that key (step 520). The VM image encryption key is used to decrypt memory pages of the encrypted VM boot image as they are fetched from storage and stored in memory (or encrypt pages flushed from memory to storage). The trust anchor stores the VM image encryption key associated with the VM image in a secure key store. At step 525, the trust anchor also generates a memory session key used to configure an encrypt/decrypt block in cache lines between an L3 cache and memory and between the L3 cache and an L2 cache on each processing core. Once the encrypt/decrypt blocks on the CPU are configured, the VM image may be fetched from storage and booted. The hypervisor may them boot the VM image and schedule it for execution (step 530).

At step 535, the hypervisor executes the VM image on one of the processing cores. As portions of the encrypted VM image are fetched from storage, the disk control block decrypts them using the VM image encryption key (step 540). The memory session key is then used to re-encrypt such elements as they are written to an L3 cache. When data for a given memory address is needed, the memory session key in the cache line between the L2 cache of a processing core and the shared L3 caches is used to decrypt data read from (and written to) the L3 cache. Thus, the data in the L3 cache (shared among multiple processing cores) remains encrypted until fetched into an L2 cache (local to a processing core).

If the VM boot image is not encrypted (step 515), then the trust anchor may still generate a memory session key in order to encrypt/decrypt all write/reads to the L3 cache made by the VM while executing on a processing core (step 525). In either case, the hypervisor may begin scheduling the VM for execution on one of the processing cores of a multi-processor CPU (step 530). Additionally, when the hypervisor initiates a context switch, the trust anchor configures the encrypt/decrypt blocks on the CPU with the appropriate VM image encryption key and memory session key for an incoming VM.

Figure 6:
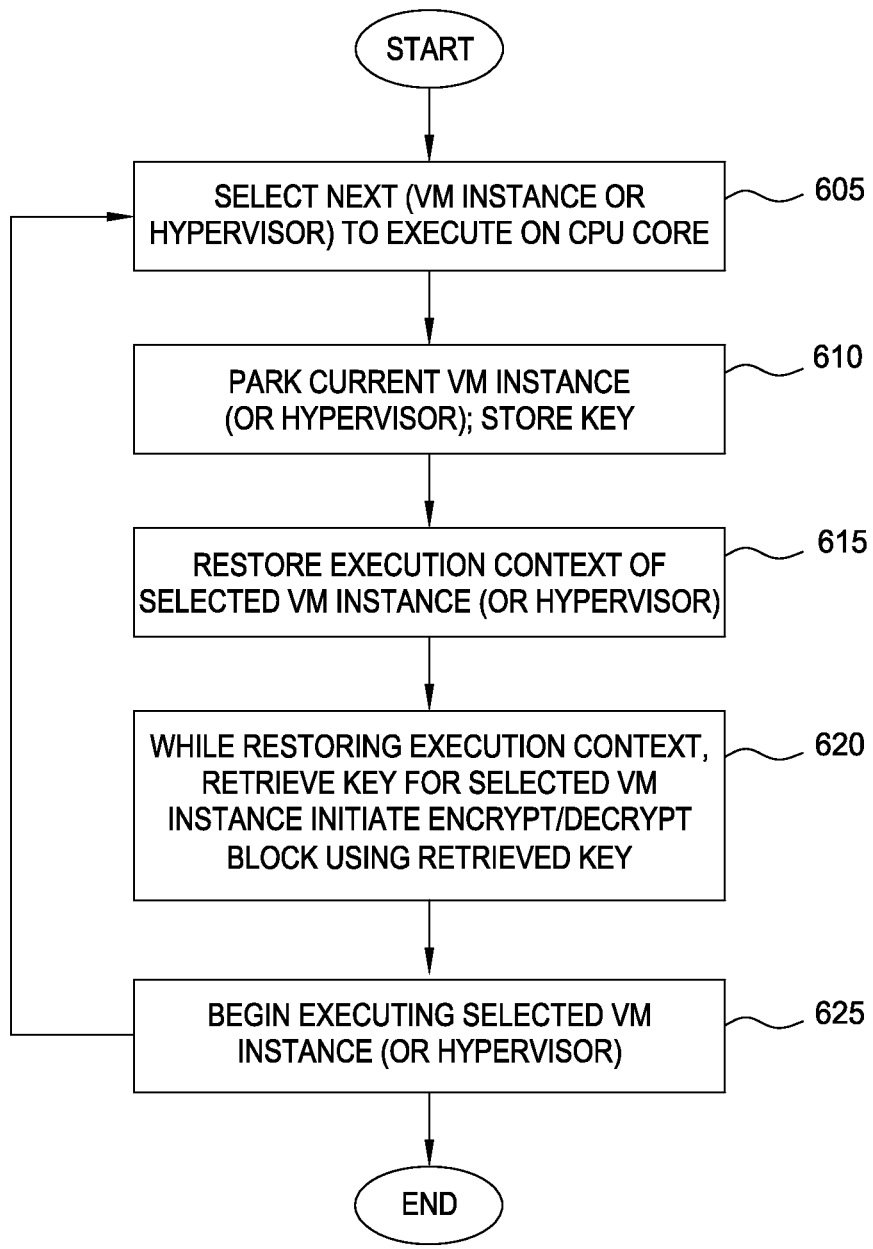
FIG. 6 illustrates a method for performing a context switch on a processing core of a multi-core CPU executing multiple VM instances, according to certain embodiments of the present disclosure.

FIG. 6 illustrates a method 600 for performing a context switch on a processing core executing multiple VM instances, according to certain embodiments of the present disclosure. As shown, the method 600 begins at step 605, where a next VM instance (or hypervisor) is selected for execution on a processing core of a CPU. For example, an exception may occur while one VM instance (or hypervisor) is being executed on the processing core (e.g., a timer interrupt, a cache miss, hardware access, etc.). When this occurs, a context switch may be initiated to park the VM instance (or hypervisor) then running on the processing core and schedule a next VM instance (or hypervisor) for execution on that core.

In one embodiment, the processing core may signal the trust anchor with an indication of an execution context for the VM instance (or hypervisor) being restored to the processing cores (i.e., of an incoming execution context). For example, as noted above, the processing cores may execute the VMEXIT and VMRESUME instructions to signal the trust anchor of the exiting and incoming execution contexts.

At step 610, the trust anchor stores the session key associated with the current execution context while the VM instance (or hypervisor) is being parked and the incoming execution context is initialized. At step 615, the execution context of the selected VM instance (or hypervisor) is restored. That is, the CPU restores any register values and associated system state needed to resume execution of a VM instance (or hypervisor) associated with the incoming execution context.

At step 620, while the current execution context is parked and the incoming execution context is restored, the trust anchor may retrieve a session key for the VM instance (or hypervisor) associated with the execution context being restored. And the trust anchor may use that session key to initialize an encrypt/decrypt block associated with the processing core performing the context switch. Once the session key is restored, and the encrypt/decrypt block is initialized, the VM instance (or hypervisor) may begin executing on the processing core. As noted above, each read/write operation moving data from/to the L3 cache may then be encrypted using the session key and key material (e.g., a memory address of any read/write operation to the L3 cache and a nonce value). Thus, memory writes performed by the incoming execution context are encrypted with a key unique to that context. Configuring the trust anchor to swap such keys based on the execution context ensures the compartmentalization of the memory of each individual execution element (i.e., of the given VM instance or the hypervisor) executed on the processing core(s) of a CPU. Thus, even if a given VM instance attempts to access an L3 cache line of another, it does not have access to the key needed to decrypt that cache line. Further, the same result would occur if the hypervisor attempted to read data stored in the L3 cache by a given VM instance, despite the hypervisor generally having a higher privilege level. In either case, as the hypervisor (and VM instances) do not have access to the session key of other VM instances, the attempted access would result in garbage data.

In sum, embodiments described herein provide techniques for securely executing multiple virtual machine instances on a multi-core CPU. A trust anchor may be configured to manage keys used to encrypt/decrypt instructions and data when executed on a core of the multi-core CPU as well as perform the encryption/description operations. When a context switch occurs, the trust anchor may restore a key (along with other data) to encrypt/decrypt memory read to and written from a shared L3 cache. In one embodiment, the CPU may signal the trust anchor with an execution context for the next VM instance (or hypervisor) scheduled for execution.

Advantageously, configuring a multi-core CPU with a trust anchor as described herein enables the trusted execution of VM instances, even in non-trusted cloud environments and on non-trusted hypervisors. That is, embodiments described herein provide a trusted execution and memory compartmentalization framework for execution of VM in third-party cloud providers independently from the provider itself being trusted or not. In one embodiment, a CPU architecture may be configured to replace a traditional trusted chain approach of TPM based architectures with a star-of-trust architecture where the CPU is at the center of the star.

While the foregoing is directed to embodiments of the present disclosure, other and further embodiments of the disclosure may be devised without departing from the basic scope thereof, and the scope thereof is determined by the claims that follow.

We claim:

1. A method for performing a context switch on a processing core of a central processing unit (CPU), comprising:
receiving an indication of an incoming execution context for the processing core, wherein the incoming execution context references an upcoming context switch to a first virtual machine instance belonging to a first enterprise to be executed on the processing core;
storing a first session key in a secure key storage, wherein the first session key corresponds to a current execution context of a second virtual machine instance belonging to a second enterprise executing on the processing core, wherein the secure key storage is managed by a hardware trust anchor in the CPU and the hardware trust anchor provides authoritative trust to session keys;
retrieving a second session key from the secure key storage, wherein the second session key corresponds to the incoming execution context;
initializing an encrypt/decrypt block on the CPU using the second session key wherein the encrypt/decrypt block is disposed between the processing core and a cache accessed by the processing core; and
initiating the incoming execution context on the processing core, wherein the encrypt/decrypt block generates a keystream used to decrypt data read from the cache and encrypt data written to the cache, wherein the encrypt/decrypt block provides a hardware implementation of a stream cipher and wherein the keystream is generated for a read operation from the cache or a write operation to the cache using the second session key, a nonce value, and a memory address targeted by the read operation or the write operation.

2. The method of claim 1, wherein the CPU includes multiple processing cores and wherein each processing core shares access to the cache.

3. The method of claim 1, wherein the first session key and the second session key are stored by a hardware trust anchor coupled to the CPU.

4. The method of claim 1, wherein the incoming execution context references a hypervisor to be executed on the processing core following the context switch.

5. A computing system, comprising,
a memory; and
a central processing unit (CPU) having:
a processing core,
a cache, and
a hardware trust anchor providing authoritative trust for session keys, wherein the hardware trust anchor is configured to:
manage a secure key storage;
receive an indication of an incoming execution context for the processing core, wherein the incoming execution context references an upcoming context switch to a second virtual machine instance belonging to a first enterprise to be executed on the processing core;
store a first session key in a secure key storage, wherein the first session key corresponds to a current execution context of a first virtual machine instance belonging to a second enterprise executing on the processing core;
retrieve a second session key from the secure key storage, wherein the second session key corresponds to the incoming execution context;
initialize an encrypt/decrypt block on the CPU using the second session key, wherein the encrypt/decrypt block is disposed between the processing core and a cache accessed by the processing core; and
initiating the incoming execution context on the processing core, wherein the encrypt/decrypt block generates a keystream used to decrypt data read from the cache and encrypt data written to the cache, wherein the encrypt/decrypt block provides a hardware implementation of a stream cipher and wherein the keystream is generated for a read operation from the cache or a write operation to the cache using the second session key, a nonce value, and a memory address targeted by the read operation or the write operation.

6. The computing system of claim 5, wherein the CPU includes a plurality of processing cores and wherein each processing core shares access to the cache.

7. The computing system of claim 5, wherein the first session key and the second session key are stored by the hardware trust anchor.

8. The computing system of claim 5, wherein the incoming execution context references a hypervisor to be executed on the processing core following a context switch.

9. A method for executing a plurality of virtual machine instances on a multi-core central processing unit (CPU), the method comprising:
determining an exception has occurred while executing a first virtual machine instance belonging to a first enterprise on a first processing core of the multi-core CPU;
signaling a trust anchor in the multi-core CPU with an indication of an incoming execution context for the first processing core, wherein the trust anchor is a hardware unit of the multi-core CPU, provides authoritative trust, and is configured to manage a secure key storage, and wherein the incoming execution context references an upcoming context switch to a second virtual machine instance belonging to a second enterprise to be executed on the first processing core;
storing a first session key in the secure key storage, wherein the first session key corresponds to a boot image of the first virtual machine executed on the first processing core;
retrieving a second session key from the secure key storage, wherein the second session key corresponds to the incoming execution context;
initializing an encrypt/decrypt block on the CPU using the second session key, wherein the encrypt/decrypt block is disposed between the first processing core and a cache shared by each processing core on the multi-core CPU; and
initiating the incoming execution context on the processing core, wherein the encrypt/decrypt block generates a keystream used to decrypt data read from the cache and encrypt data written to the cache, wherein the encrypt/decrypt block provides a hardware implementation of a stream cipher and wherein the keystream is generated for a read operation from the cache or a write operation to the cache using the second session key, a nonce value, and a memory address targeted by the read operation or the write operation.

* * * * *